United States Patent [19]
Heit

[11] 3,778,798
[45] Dec. 11, 1973

[54] FOOD PREPARATION ELECTRIC THERMOMETER ALARM CIRCUIT

[75] Inventor: Henry J. Heit, Louisville, Ky.

[73] Assignee: General Electric Company, Louisville, Ky.

[22] Filed: May 1, 1972

[21] Appl. No.: 249,386

[52] U.S. Cl. ............ 340/228 R, 340/233, 323/75 E, 307/252 F, 99/421 TP, 99/342, 73/252
[51] Int. Cl. ............................................. F24c 15/00
[58] Field of Search .................. 340/227, 227.1, 228, 340/233; 99/421 TP, 342; 73/352, 343 R, 73/343 B, 193 A; 307/252 F; 323/75 E; 317/133 S; 338/28

[56] References Cited
UNITED STATES PATENTS

| | | | |
|---|---|---|---|
| 3,611,336 | 10/1971 | Chen | 340/233 |
| 3,062,943 | 11/1962 | Euler | 99/421 TP X |
| 2,657,580 | 11/1953 | Schroeder | 73/352 X |

OTHER PUBLICATIONS
G.E. Application Note, "The D13-T – A Programmable UJT," W. R. Spofford, 12-19-67 pp. 187.

*Primary Examiner*—John W. Caldwell
*Assistant Examiner*—William M. Wannisky
*Attorney*—Richard L. Caslin et al.

[57] ABSTRACT

Solid-state circuitry is provided for an electrical thermometer for monitoring the interior temperature of meat being cooked. A temperature sensing thermistor located in the tip of a probe, adapted to be partially inserted in meat being cooked so as to monitor the interior temperature, is combined in circuit with a programmable unijunction transistor (PUT), used as a bridge detector, and a signal buzzer such that upon the reaching of a preset temperature within the meat, the buzzer is actuated. The self-heat of the thermistor probe provides a latching effect ensuring the continued firing of the PUT with the resultant smooth operation of the buzzer. A zener diode is combined in circuit to allow a slight back current to flow through the buzzer, thereby allowing the use of a buzzer with a fairly non-critical air gap.

9 Claims, 3 Drawing Figures

PATENTED DEC 11 1973　　　　　　　　3,778,798

3,778,798

FOOD PREPARATION ELECTRIC THERMOMETER ALARM CIRCUIT

BACKGROUND OF THE INVENTION

The present invention relates to a condition responsive circuit, and particularly to circuitry comprising an electrical thermometer for monitoring the interior temperture of meat being cooked.

This invention was conceived as an improvement over the food-temperature monitoring apparatus of the copending application of Stanley B. Welch, Ser. No. 124,325 filed Mar. 15, 1971, and assigned to the General Electric Company, the assignee of the present invention. Both of these food-temperature monitoring devices were developed for use in monitoring the temperature of meat while it is being cooked in a baking or roasting oven. Both of these devices provide a needle-like meat probe enclosing a small sensing thermistor, adapted to be driven into the meat, in circuit with a programmable unijunction transistor employed as a detector of a Wheatstone bridge having a low voltage AC supply, and a signal buzzer to be actuated upon reaching a desired temperature within the meat.

The present invention improves upon the previous invention by locating the signal buzzer within the circuit such that current to operate it does not flow through the voltage dividing resistors of the Wheatstone bridge, allowing the use of low wattage type resistors. The thermistor probe is relocated within the circuit such that the self-heat of the probe provides a latching effect in the circuit to ensure the continued firing of the programmable unijunction transistor. A zener diode in series with the buzzer alarm allows a slight back current to flow through the buzzer resulting in a greatly increased amount of magneto-motive force variation therein, allowing a much less critical buzzer air gap.

It is therefore a general object of the present invention to provide a circuit, including a programmable unijunction transistor, that is responsive to a condition change such that the change is sensed and translated as a variance in electrical resistance in the circuit whereby signal means is triggered to indicate the condition change.

It is a more particular object of the present invention to provide a low-cost solid-state electric meat thermometer with a circuit ensuring the smooth reliable operation of an alarm buzzer upon reaching a predetermined preset temperature within the meat wherein the circuit allows a small back current to flow through the buzzer such that the buzzer may be characterized by a fairly non-critical air gap.

SUMMARY OF THE INVENTION

In accordance with the present invention, a condition responsive circuit of the type having impedance means for supplying an indication of external conditions to be sensed, includes a pair of input supply terminals for supplying alternating current. A four-leg impedance bridge network having first and second common terminals is coupled across these input supply terminals, and two comparison terminals are located intermediate respectively the first and second legs and the third and fourth legs of the bridge network. A programmable unijunction transistor (PUT) is included in circuit such that its cathode is connected to the first common network terminal, its anode is connected to the terminal intermediate the first and second legs, and its gate is connected to the terminal intermediate the third and fourth legs. The sensing means is adapted to be coupled in circuit with either the first or the third leg of the beidge network. An indication means which is adapted to be responsive to the switched-on state of the PUT to become operative is coupled between the second common network terminal and the anode of the PUT.

DESCRIPTION OF THE PREFERRED EMBODIMENT

Figure 1:
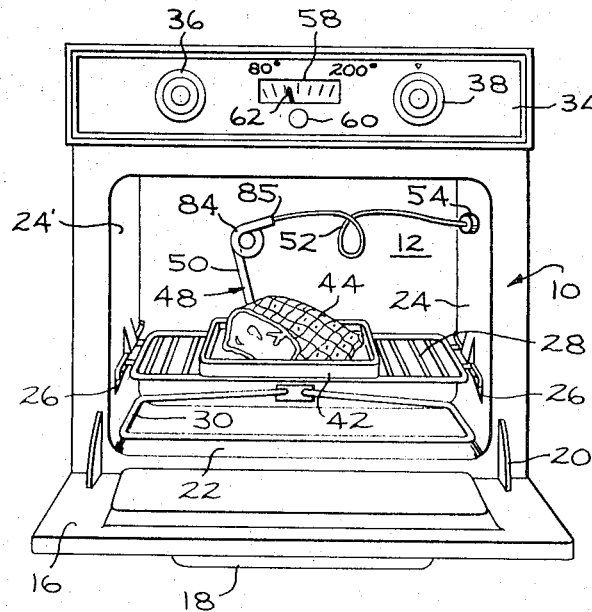
FIG. 1 is a front elevational view of an electric, built-in wall oven shown with the oven door open and an electric meat thermometer system is illustrated therewith.

Referring to FIG. 1 of the accompanying drawing, there is shown for illustrative purposes an electric, built-in wall oven 10 in which the present invention may be incorporated, although it will be obvious to those skilled in the art that this invention is in no way limited to such a setting or application. This oven 10 is of standard construction having an oven cooling cavity 12 framed by box-like oven linear 14 and a front-opening access door 16. The door 16 is shown in this view in its horizontal, fully-open postion.

The oven liner 14 has a bottom wall 22 and opposite side walls 24, $24^1$ which are framed with rack supports or ledges 26. A slidable food supporting rack 28 is suspended between the rack supports 26. A lower baking element 30 is positioned adjacent the bottom wall 22 of the oven liner.

A control panel 34 is shown positioned above the oven in a frontal position to occupy substantially the same vertical plane as the oven door 16 when this door is in its vertical, closed position. The electrical controls of the oven are mounted in this control panel. There is shown, for example, oven selector switch 36 and oven thermostatic control 38 for governing the temperature within the oven cooling cavity 12. An oven timer (not shown) is also commonly furnished with the oven.

Oven rack 28 supports a shallow pan 42, shown containing a half of ham 44 which, for example, is to be baked to an internal temperature of about 150°F while the oven ambient temperature is set by oven thermostat 38 to, say 350°F. Obviously, more massive cuts of meat must be heated for a greater length of time than smaller cuts; this variable cooling time serves to inconvenience the cook by requiring close supervision of the cooking process. An electric thermometer, such as that provided by the present invention, serves to ameliorate this situation. Shown within the oven 10 is an electric thermometer system 48 comprising, in part, needle-like meat probe 50 with its tip inserted into the central portion of the meat 44. A flexible cable 52 is attached to the other end of the probe, this cable is of such length that it may be connected to a wall-mounted receptacle 54 in one of the side walls of oven liner 14. The receptacle 54 is provided with connecting cables (not shown) which extend upwardly to the oven control panel 34 where they join with terminals of the circuitry of the present invention. Temperature setting gauge 58 is included and is shown with a temperature scale extending from 80°F to 200°F. There is provided a manually adjustable knob 60 and a pointer 62 that moves when the knob is turned, for setting a predetermined internal temperature to be reached within the meat 44.

Figure 2:
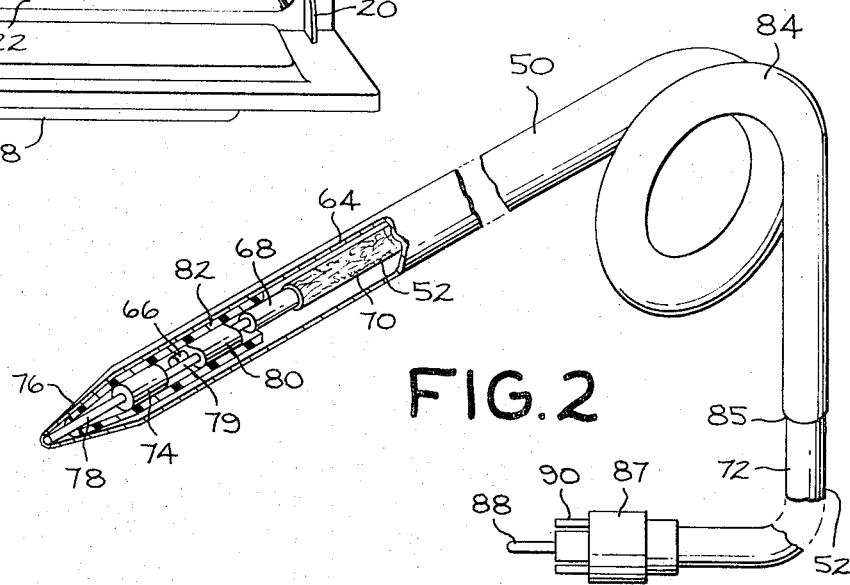
FIG. 2 is a perspective view of a temperature sensing meat probe first shown in FIG. 1 and here shown on an enlarged scale and having a part of its metal sheath removed to illustrate the internal construction.

The temperature sensing meat probe 50 is shown in FIG. 2 as comprising a thin wall stainless steel tubing 64 of about 3/32 inch outside diameter having the overall appearance of a knitting needle. Within the probe 50 is assembled flexible coaxial cable 52 comprising a center conductor 66, a layer of insulation 68, and a woven outer conductor 70 surrounding the insulating layer 68. Cable 52 is covered with another sheath 72 of high temperature insulation such as polytetrafluoroethylene, commonly sold under the trademark Teflon. This coaxial cable 52 is extra-flexible and has the characteristics of a small diameter lead wire. Most of this insulating sheath has been stripped from that portion of the cable length extending within tubular probe 64.

Impedance means for supplying an indication of external conditions to be sensed, such as temperature sensitive thermistor 74, is positioned within the free end 76 to probe 50. This free end is pointed so as to facilitate the insertion of the probe into the meat. Thermistor 74 has two terminals, 78 and 79, each extending longitudinally from opposing ends thereof. The outermost terminal 78 is electrically and mechanically attached to the pointed tip 76 of the probe, while the innermost terminal 79 is electrically connected to the center conductor 66 of the coaxial cable 52 by means of a crimped sleeve 80. Outer conductor 70 has been stripped back from the exposed center conductor 66 and an insulating sleeve 82 is assembled over the exposed portion of the cable to insulate center conductor 66 from the tubular probe. The innermost end of tubular probe 64 is wound into a closed loop as at 84, serving to collapse the tube tightly into contact with the outer conductor 70 and further, to seal the tube at end 85 over the Teflon insulation 72. This loop also serves as a hand-hold for grasping the probe. The free end of the cable 52 is provided with an electrical plug 87 having a central conductor 88 insulated electrically from an overlying cylindrical split collar 90 for holding the plug in the wall-mounted receptacle 54 as shown in FIG. 1.

Figure 3:
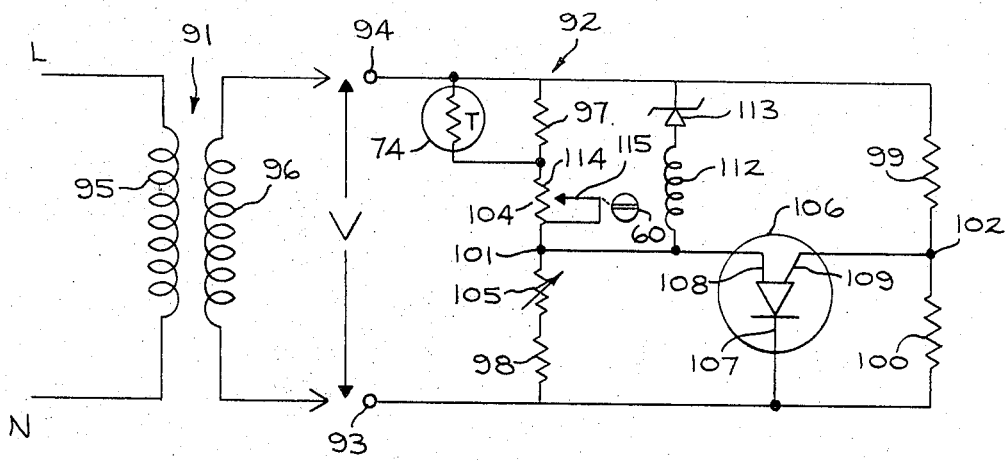
FIG. 3 is a schematic diagram of the preferred embodiment of the improved solid-state electric meat thermometer of the present invention.

In accordance with the present invention, condition responsive circuitry, such as temperature responsive alarm control circuit 92, schematically illustrated in FIG. 3 of the drawing, includes input supply terminals 93 and 94 for connection of a low-voltage AC power source, such as a suitable step-down transformer 91 having a primary winding 95 and a secondary winding 96. The primary 95 may be connected to a standard electrical power source of 115 volt, 60 Hz. current, available in the home, by proper connection of lines L and neutral N. Step-down transformer 91 may be a separate transformer for this electric thermometer system 48 or, power may be tapped from the existing transformer used for the oven control 38.

There is a four-leg impedance bridge network having first and second common terminals coupled across the input supply terminals 93 and 94, respectively, such as the Wheatstone bridge comprising a first leg including fixed resistor 97, a second leg including fixed resistor 98, a third leg including fixed resistor 99 and a fourth leg including fixed resistor 100. The first and second legs and the third and fourth legs form, respectively, voltage divider networks having comparison terminals 101 and 102. Temperature sensing thermistor 74 of probe 50 is electrically connected in circuit with the first leg so as to be in parallel with fixed resistor 97. A variable resistor 104 is electrically connected in circuit with the first leg so as to be in series with the parallel combination of thermistor 74 and fixed resistor 97. Variable resistor 105 is serially connected with fixed resistor 98 in the second leg.

A programmable unijunction transistor (PUT) 106 has its cathode 107 connected to the first common network terminal and input terminal 93, an anode 108 connected to comparison terminal 101 intermediate the first and second legs of the bridge and a gate 109 connected to comparison terminal 102 intermediate the third and fourth legs of the bridge.

Indication means which may take the form of an audible signal means, such as an alarm buzzer having a coil 112, is connected serially with a zener diode 113 between the anode 108 of PUT 106 and the second common network terminal, input terminal 94.

A PUT is a PNPN device with characteristics such that, when the diode (anode to gate) becomes forward biased, (i.e., when the anode is more positive than the gate) it conducts, and the regeneration inherent in such a device causes it to switch on; a negative resistance characteristic is generated from anode to cathode. Thus, the PUT 106 functions as a detector for the bridge circuit, as described above.

Thermistor 74, as used here in the first leg of the bridge, has a negative temperature coefficient. As the temperature of the thermistor rises, its resistance drops; during the positive half cycle of the AC supply voltage, that voltage at terminal 101, or the anode voltage, becomes more positive. When the anode voltage becomes slightly more positive than the gate voltage, the PUT will switch on with a voltage drop from anode to cathode of approximately 1 volt. Essentially then, the voltage is dropped by the combination of the impedances of thermistor 74, resistor 97 and variable resistor 104 in the first leg. When the positive voltage at terminal 94 becomes greater than the zener breakdown voltage of zener diode 113, current will flow through the diode and through coil 112 causing the alarm buzzer to be activated. Since coil 112 is placed serially with zener diode 113 and PUT 106 anode-cathode across the power input terminals, current through coil 112 is limited only by the coil's impedance.

There are certain advantages in a circuit arrangement of this type. First, since they need not carry buzzer current, all the resistors of the bridge network may be of the high-impedance, low-wattage type. Secondly, with the thermistor 74 located in the first leg of the bridge, the self-heat of the probe provides a latching effect in the circuit. The first time that the PUT fires, the effective voltage across the probe increases, further heating the probe and thermistor 74 thereby decreasing its resistance and the resistance of the first leg, ensuring the continued firing of the PUT and the smooth operation of the alarm buzzer. Third, a slight back current, limited by the impedance of resistors 98 and 105, can flow through the coil 112 resulting in a greatly increased amount of magneto-motive force variation, allowing in turn, the use of a buzzer with a fairly non-critical air gap.

Turning now to the operation of the circuit 92 as a food temperature monitoring device, control knob 60 (as shown in FIGS. 1 and 2) on control panel 34 is associated with the variable resistor 104, a setting rheostat, for presetting the desired temperature to be reached within the meat 44 when fully cooked. Variable resistor 104 includes a resistor element 114 and an arm 115, which is movable across the resistor element 114 upon the rotation of control knob 60. Combined with the control knob 60 is the temperature gauge 58 and the pointer 62 which moves only when knob 60 is turned.

The value of resistor element 114 is set such that, during the positive half-cycle of the AC voltage, the anode-cathode voltage of the PUT 106 is slightly more positive than the gate-cathode voltage, so as to cause the PUT to fire, when a temperature sensitive variable resistor, such as thermistor 74, reaches a value which corresponds to the temperature set by the pointer 62 on gauge 58, and hence, the movable arm 115 of control knob 60.

A thermistor shunt resistor 97 is included to linearize the thermistor characteristics so as to yield a reasonably linear temperature scale 58.

The critical point of the circuit is reached when the instantaneous applied voltage is a maximum; this occurs at the peak of the positive half-cycle. At this point, the equivalent impedance of resistors 104, 97 and 74 is always some constant value and the circuit is calibrated to be critical at this value by means of the variable resistor 105 in the second leg of the bridge network.

As stated above, the setting of control knob 60 at a given temperature on scale 68 provides the setting rheostat 104 with a resitance value such that the firing of the PUT 106 will coincide with the reaching of that preset temperature within the meat, which temperature is being sensed by the thermistor 74 in the tip of meat probe 50. Upon reaching that preset temperature, PUT 106 will switch on, and current will flow to actuate buzzer coil 112 and thereby give an audible signal that the predetermined temperature has been reached.

This electric meat thermometer system is a "slide back" system which sounds the buzzer 112 when the internal meat temperature reaches the preset temperature, but does not indicate the existing temperature directly. Should the operator desire to know the internal meat temperature during the cooking cycle, she may determine this by moving pointer 62 down the temperature scale until the buzzer sounds, then reading the indicated temperature on gauge 58.

The circuit components of the present invention are easily adapted to be mounted upon a printed circuit board (not shown). Sufficient space may also be provided for mounting the temperature indicating scale 58 thereon, and a simplified interconnector between cable 52 of probe 50, and likewise of thermistor 74, and the printed circuit board may also be provided.

While it has been shown that a voltage divider comprising resistors 99 and 100 may serve to provide a voltage for gate 109 of PUT 106, it will be obvious to those skilled in the art that gate 109 may be connected directly to a point on the secondary winding 96 of transformer 91.

Components found to be satisfactory in the illustrated embodiment of the present invention are:

| | |
|---|---|
| Resistor 97 | 2.7 K ohms |
| Resistor 98 | 3.6 K ohms |
| Resistor 99 | 1.1 K ohms |
| Resistor 100 | 2.2 K ohms |
| Rheostat 104 Variable | 0-1350 ohms |
| Resistor 105 | 0-3 K ohms |
| PUT 106 | GE No. D13T 1 |
| Coil 112 | 50 ohms |
| Zener diode 113 | GE No. X16A3593, 7.2/9.0 volts |
| Thermistor 74 | National Lead type 2H103; 10 K ohms at 77°F |

While that which has been heretofore described refers to a solid-state circuit device for monitoring the temperature of food being cooked, it will be obvious that such a device has further novel applications. It may, for example, be used as a fire-detection system or, thermistor 74 may be replaced by a photo-sensitive resistor thereby allowing the device to be used to activate lighting systems, and when thus used in conjunction with a small light source, it may be used as a smoke detection system or a burglar detector. Thermistor 74 may also be replaced by a pressure-sensitive resistor allowing the device also to be used as a burglar detector.

It should be apparent to those skilled in the art that the embodiment described heretofore is considered to be the presently preferred form of this invention. In accordance with the Patent Statutes, changes may be made in the disclosed apparatus and the manner in which it is used without actually departing from the true spirit and scope of this invention.

What is claimed is:

1. A condition-responsive circuit of the type having impedance means for supplying an indication of external conditions to be sensed, said circuit comprising:
   a. a pair of input supply terminals for supplying a source of alternating current;
   b. a four-leg impedance bridge network having first and second common terminals coupled across the input supply terminals and two comparison terminals intermediate respectively the first and second legs of the bridge network and the third and fourth legs;
   c. a programmable unijunction transistor having a cathode connected to the first common bridge network terminal, an anode connected to the first common bridge network terminal, an anode connected to the terminal intermediate the first and second legs, and a gate connected to the terminal intermediate the third and fourth legs such that said programmable unijunction transistor functions as a null detector in said bridge network;
   d. said sending means being removably coupled in circuit with one of said legs adjacent said second common terminal of the bridge network; and
   e. indication means coupled between the second common network terminal and the anode of the programmable unijunction transistor and being responsive to the switched-on state of the programmable unijunction transistor to become operative.

2. The circuit of claim 1 wherein the sensing means is adapted to be in circuit with the first leg of the impedance bridge and is an impedance with a negative temperature coefficient.

3. The circuit of claim 1 wherein the sensing means is adapted to be in circuit with the third leg of the impedance bridge and is an impedance with a positive temperature coefficient.

4. The circuit of claim 2 wherein the impedance with a negative temperature coefficient is a temperature-sensitive thermistor.

5. The circuit of claim 2 wherein the impedance is a photo-sensitive resistor.

6. The circuit of claim 2 wherein the impedance is a pressure-sensitive resistor.

7. A condition-responsive circuit of the type having thermistor means for supplying an indication of an external temperature to be sensed, comprising:
   a. a pair of input supply terminals for supplying a source of alternating current;
   b. a four-leg impedance bridge network having first and second common terminals coupled across the input supply terminals and two comparison terminals intermediate respectively the first and second legs of the bridge network and the third and fourth legs;
   c. a programmable unijunction transistor having a cathode connected to the first common bridge network terminal, an anode connected to the terminal intermediate the first and second legs, and a gate connected to the terminal intermediate the third and fourth legs such that said programmable unijunction transistor functions as a null detector in said bridge circuit;
   d. said thermistor means having a negative temperature coefficient being removably coupled in circuit with the first leg of the bridge network such that the self-heat of said thermistor provides a latching effect to insure the continued firing of said programmable unijunction transistor once started; and
   e. indication means coupled between the second common network terminal and the anode of the programmable unijunction transistor and being responsive to the switched-on state of the programmable unijunction transistor to become operative.

8. A temperature-responsive alarm control circuit of the type having probe means, including a temperature-sensitive thermistor, to be inserted into food being cooked for monitoring the interior temperature thereof, the circuit comprising:
   a. a pair of input supply terminals for supplying a source of alternating current;
   b. a four-leg impedance bridge network having first and second common terminals coupled across the input supply terminals and two comparison terminals intermediate respectively the first and second legs and the third and fourth legs of the bridge network;
   c. a programmable unijunction transistor having a cathode connected to the first common bridge network terminal, an anode connected to the terminal intermediate the first and second legs, and a gate connected to the terminal intermediate the third and fourth legs such that said programmable unijunction transistor functions as a null detector in said bridge network;
   d. the temperature-sensitive thermistor of the probe means having a negative temperature coefficient and being removably coupled in circuit with the first leg of the bridge network such that the self-heat of said thermistor provides a latching effect to insure the continued firing of said programmable unijunction transistor once started;
   e. a manually variable resistor connected serially in circuit with the thermistor in the first leg;
   f. a buzzer alarm device, coupled serially with the second common network terminal and the anode of the programmable unijunction transistor and being responsive to the switched-on state of the programmable unijunction transistor to become operative; and
   g. a zener diode coupled serially between said alarm device and said second common network terminal for allowing a slight back current to flow through said alarm device to result in increase magnetomotive force variation therein.

9. The circuit of claim 8 wherein the buzzer alarm device is of very low impedance as compared with the impedances of the individual legs of the bridge network.

* * * * *